July 19, 1955 C. D. AUSTIN 2,713,508
CARTON CARRIER
Filed June 25, 1951 7 Sheets-Sheet 1

INVENTOR.
CARROLL D. AUSTIN
BY Charles M. Pryer
ATTORNEY

July 19, 1955

C. D. AUSTIN

2,713,508

CARTON CARRIER

Filed June 25, 1951

INVENTOR.
CARROLL D. AUSTIN
BY Charles M. Pryer
ATTORNEY

July 19, 1955   C. D. AUSTIN   2,713,508
CARTON CARRIER

Filed June 25, 1951   7 Sheets-Sheet 5

INVENTOR.
CARROLL D. AUSTIN
BY Charles M. Fryer
ATTORNEY

July 19, 1955 C. D. AUSTIN 2,713,508
CARTON CARRIER
Filed June 25, 1951 7 Sheets-Sheet 6

INVENTOR.
CARROLL D. AUSTIN
BY
ATTORNEY

July 19, 1955

C. D. AUSTIN 2,713,508

CARTON CARRIER

Filed June 25, 1951

INVENTOR.
CARROLL D. AUSTIN
BY
ATTORNEY.

United States Patent Office 2,713,508
Patented July 19, 1955

2,713,508

CARTON CARRIER

Carroll D. Austin, San Rafael, Calif., assignor, by mesne assignments, to Edlo, Incorporated, San Francisco, Calif., a corporation of California Application June 25, 1951, Serial No. 233,280

14 Claims. (Cl. 294—87.2)

This invention relates to a carton carrier, and more particularly to a carrier in the form of a collar for supporting a plurality of cartons to provide a compact and readily portable package therefor.

It is desirable to provide a carrier for many types of cartons adapted to contain various kinds of products; particularly a carrier with a handle for forming a compact and readily portable package of a plurality of such cartons. For example, in the retail distribution of milk commonly packaged in paperboard cartons, it is advantageous to provide a compact package of two of such milk cartons, which is provided with a carrying handle. This makes it convenient and easy for the customer to carry the packaged cartons, and provides the customer with two individual milk cartons where such quantity of milk is desired instead of a larger carton for the same quantity; the larger carton being more cumbersome to carry.

Furthermore, the customer, when purchasing two milk cartons of the desired size, need only open one at a time when it is desired to consume the milk, thus obviating the necessity of exposing all the milk which would be the case if the milk were packaged in a single larger carton. Also, storage room will generally be more easily found in the usual household refrigerator, for the two smaller cartons.

Summarizing this invention, it has, as its objects, among others, the provision of an improved carton carrier for a plurality of cartons, which is of simple and economical construction, and which can be easily carried and handled. Although the carrier of this invention has been found particularly advantageous for conventional types of paperboard milk cartons, it can be employed with cartons for other products.

It is formed of a single strip of suitable material, preferably paperboard, which is scored to form creases providing a plurality of hingedly connected panels enabling the carrier to be folded in the form of a collar having adjacent open top and bottom cells for embracing a pair of adjacent cartons positioned in side by side substantially contacting relationship. Means is provided on the collar in the form of integral hingedly connected abutment flaps engageable with abutment portions on the cartons to support the cartons on the collar. A plurality of panels of the strip are at such location that when the strip is folded they will extend between adjacent cartons; and they have portions extending above the upper end of the collar to provide a handle portion for the carrier.

Referring to the drawings.

With reference to Figs. 1 through 7, the modification illustrated is particularly adapted for a well-known type of paperboard milk carton illustrated in Patent No. 2,288,914, which has a peaked top 2 and triangularly shaped concavities 3 in each of opposite sides adjacent the top. As a result of the formation of such concavities 3, abutment portions 4 are formed under the top of the carton, against which abutment portions on the carrier are adapted to engage, to support the carton.

Figure 1:
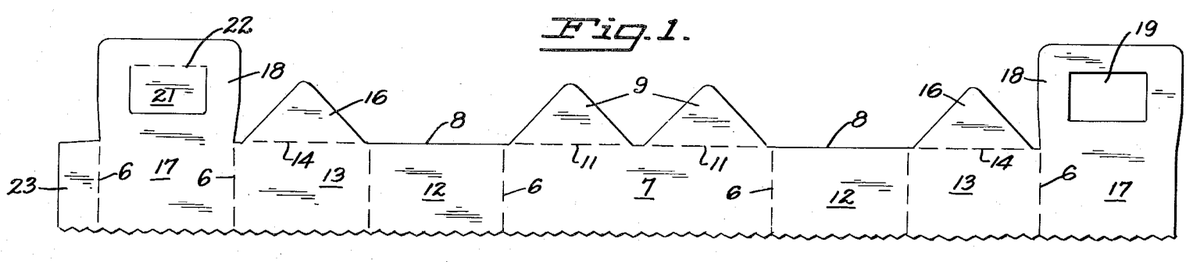
Fig. 1 is a plan view of a form of blank for the carrier collar strip, looking at the inside face of the blank.
Figure 2:
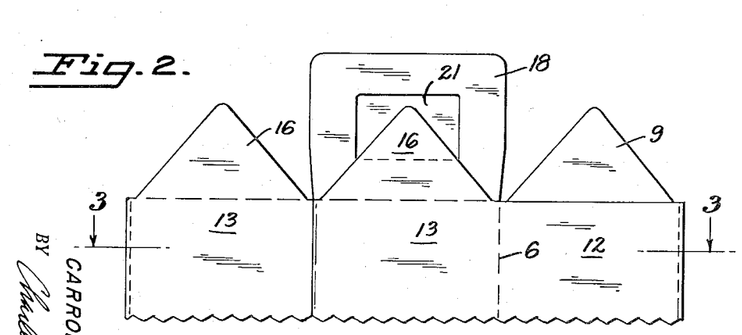
Fig. 2 is an upright side elevational view of the carrier collar in collapsed state.

Referring to Fig. 1 the blank for the carrier collar is formed of a single strip of paperboard, and is scored to provide suitable vertical crease lines 6 which form individual hingedly connected panels enabling the strip to be folded into the form of a collar adapted to embrace a plurality of the cartons positioned in side by side relationship. One of such panels 7 is longer than the others and is adapted to extend across the sides of two adjacent cartons.

Extending from the upper end 8 of the strip and from panel 7 are a pair of upwardly extending triangularly shaped flaps 9 hingedly connected to the strip along score lines 11. These flaps and all other similar flaps are of substantially the same size and shape as the triangularly shaped carton concavities 3 to fit snugly therein when pushed into such concavities. The upper edges of flaps 9 are adapted to serve as abutment edges to engage abutment portions of the carton when the flaps are pushed inwardly into carton concavities 3, in a manner to be described. Adjacent each end of panel 7 is a panel 12 which is adapted to engage another side of a carton; and each of panels 12 is also hingedly connected to a panel 13 which when the strip is folded engages a side of a carton opposite to that engaged by panel 7. Each of panels 13 has hingedly connected thereto by score line 14 a triangularly shaped abutment flap 16 similar to each of flaps 9.

Connected to each of panels 13 is an end panel 17 which when the collar is in set up position extends across the collar at such location opposite a panel 12, so as to be between the sides of adjacent cartons and engage a side of a carton. Each of panels 17 has an integral handle portion 18 which extends above the upper end 8 of the collar. One of handle portions 18 is formed with an aperture 19 and the other of handle portions 18 is formed with a cut-out flap 21 hingedly connected to such portion 18 by score line 22. Flap 21 is of substantially the same shape and size as aperture 19 so that when flap 21 is turned upwardly on score line 22 and projected through aperture 19 a conventional form of handle opening is provided.

Figure 4:
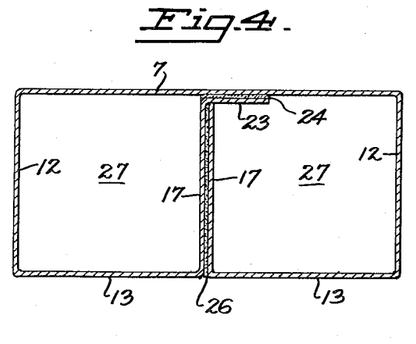
Fig. 4 is a similar section but with the carrier collar set up.

In this connection, one of panels 17, the left one appearing in Fig. 1 is provided with a hingedly connected securing flap 23 enabling the strip to be secured at portions thereof so that it may be set up from a collapsed position. In forming the collar from the strip, the left hand panels 12, 13 and 17 as they appear in Fig. 1 are bent inwardly as indicated in Fig. 4, and securing flap 23 is permanently adhesively secured to the inside face of panel 7 by a layer 24 of any suitable paperboard adhesive. The right hand panels 12, 13 and 17 are turned inwardly in a like manner; and the collar is preformed by securing the outside faces of panels 17 including their handle extensions 18 by means of another layer 26 of any suitable paperboard adhesive.

Figure 3:
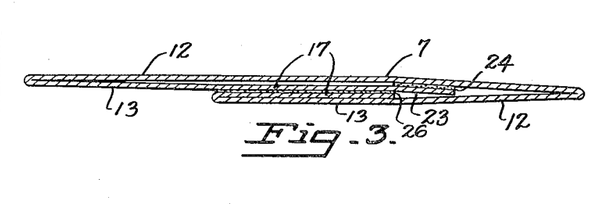
Fig. 3 is a horizontal section taken in a plane indicated by line 3—3 in Fig. 2.
Figure 5:
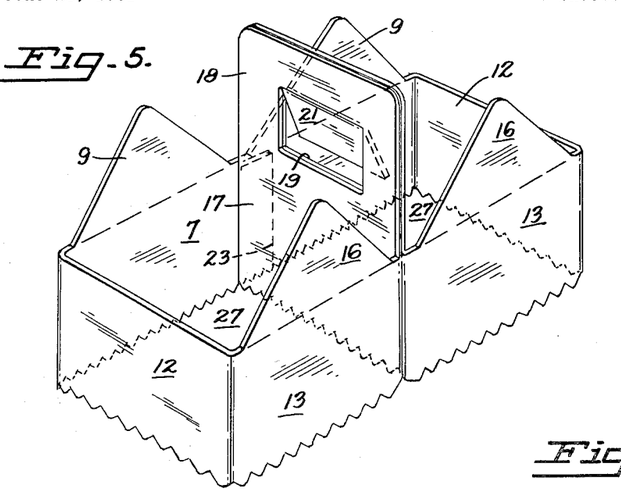
Fig. 5 is an isometric view of the set up carrier collar.
Figure 6:
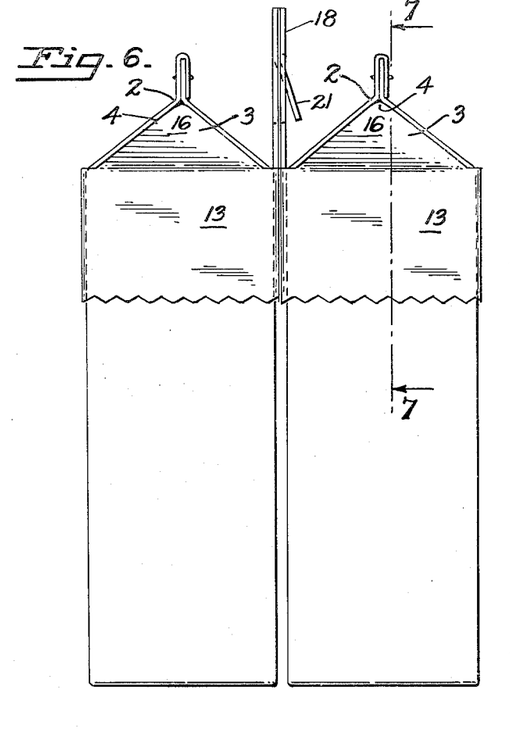
Fig. 6 is a side elevational view of the carrier collar embracing a pair of adjacent milk cartons of one well-known type.
Figure 7:
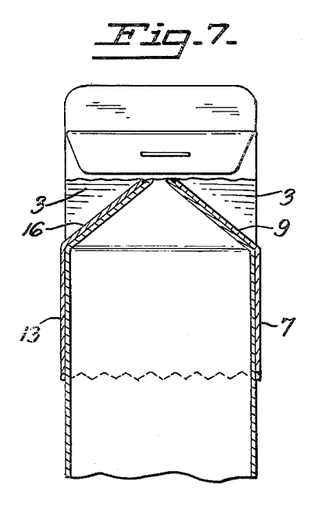
Fig. 7 is a fragmentary vertical sectional elevation taken in a plane indicated by line 7—7 in Fig. 6.
Figure 8:
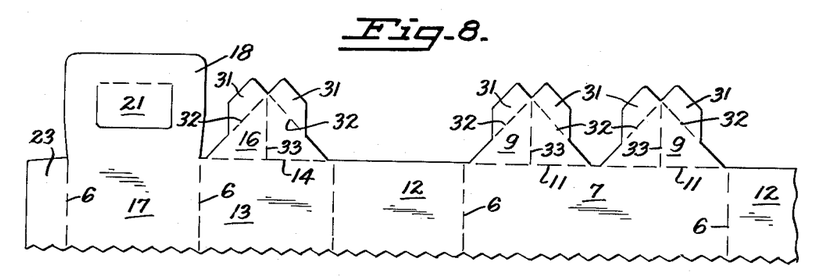
Fig. 8 is a fragmentary plan view of a blank similar to Fig. 1, but embodying a slight modification.
Figure 9:
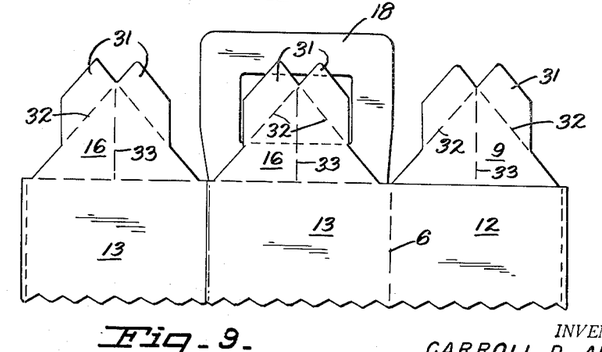
Fig. 9 is an upright side elevational view of the carrier collar of Fig. 8 in collapsed state.
Figure 10:
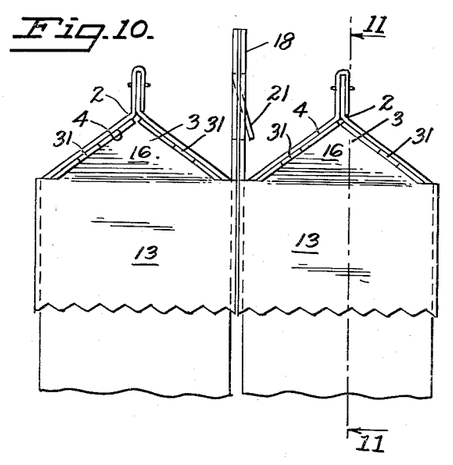
Fig. 10 is a fragmentary side elevational view of such carrier collar embracing a pair of milk cartons of the type illustrated in Fig. 6.
Figure 11:
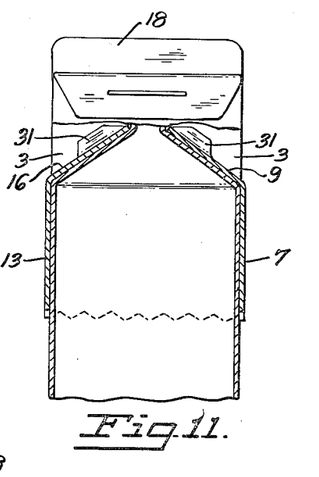
Fig. 11 is a fragmentary vertical sectional elevation taken in the plane indicated by line 11—11 in Fig. 10.

Thus, the preformed collar may be folded in a collapsed position by virtue of the crease lines, as indicated in Fig. 3; and when ready for use, it can be readily set up as indicated in Figs. 4 and 5. In the set up position, the collar forms two cells 27 each of substantially the same cross sectional configuration as the cross sectional configuration of the carton, and which is open at both the top and the bottom thereof so that the carton may be readily slipped therein. When the cartons are positioned in the cells 27, the handle provided by the adhesively secured portions 18, extends across the collar between and above the cartons so that it may be readily grasped.

After the cartons are slipped into the cells, the abutment flaps 9 and 16 at opposite sides of the collar and which are hingedly connected to the upper edges of such sides on the upper end of the collar, can be readily pushed inwardly into the side concavities 3 of the cartons to thus support the cartons positively along the edges of such flaps, and prevent the cartons from falling through the carrier. The individual cartons can be readily removed by pulling them upwardly from their retaining cells.

The modification of Figs. 8 through 11 is substantially the same as that previously described, and is adapted for the same type of carton. Hence, the same reference characters are applied as are applied to the corresponding elements of the previously described modification. The primary difference between the two forms, resides in the provision of additional flaps 31 hingedly connected to the abutment edges of each of flaps 9 and 16. When flaps 9 and 16 are pushed into the concavities 3, flaps 31 are automatically bent along crease lines 32 to provide a larger surface area support for the cartons on the abutment edges of flaps 9 and 16. Also, flaps 31 enhance frictional engagement with the abutment portions of the carton concavities. Preferably, each of flaps 9 and 16 is provided with an upright bisecting score line 33 which facilitates pushing of such flap into a concavity.

The carrier of Figs. 12 through 16 is adapted for another well known form of milk carton and embodies the general principles of the previously described modifications. Such other form of milk carton is also made of paperboard and has a substantially flat top with a projecting rim portion 36, and a corner pouring spout 37 on the top; being of the type illustrated in Patent No. 2,328,579. Rim portion 36 provides the abutment portion adapted to be engaged by a carrier abutment flap which is adapted to engage along its upper edge under abutment portion 36.

Figure 12:
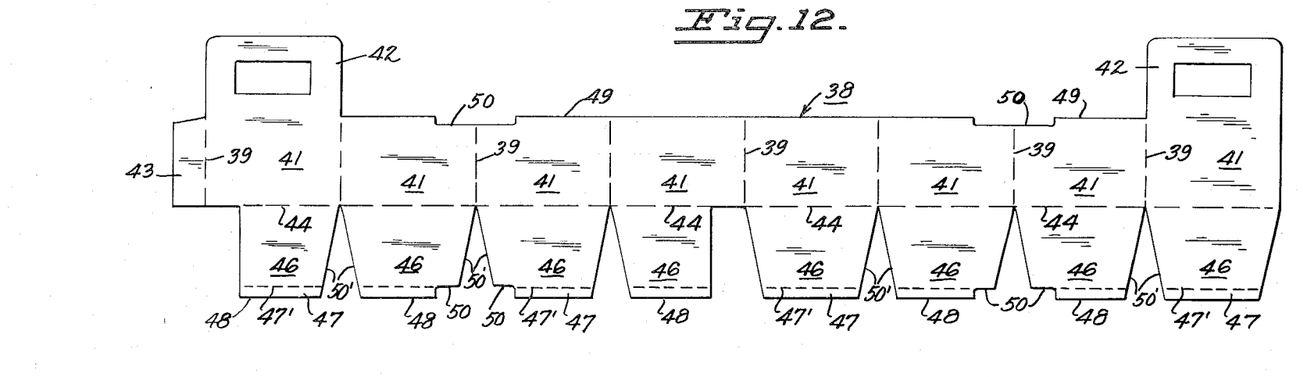
Fig. 12 is a plan view of a blank embodying a modified construction, adapted to provide a carrier collar for milk cartons of another well known type, looking at the inside face of the blank.

Blank 38 for the carrier is also of paperboard, and has a paneling arrangement somewhat similar to the previously described blanks, being scored to provide vertical crease lines 39 to form hingedly connected carton embracing panels 41. The extreme end panels 41 are equivalent to panels 17 of the blank of Fig. 1, and are also adapted to extend across the collar between adjacent cartons. They are provided with upwardly extending handle portions 42 which together with such end panels 41 are adapted to be adhesively secured together in face to face relationship to form the handle of two layers of material. To one of end panels 41, the left one appearing in Fig. 12, is hingedly connected securing flap 43 which is adhesively secured to the inside face of the fourth from the left panel 41 of the strip, in a manner somewhat similar to the securing of flap 23 of Fig. 1, to panel 7. The preformed collar can be set up from a collapsed position shown in Fig. 13 to the set up position shown in Fig. 14.

Figure 13:
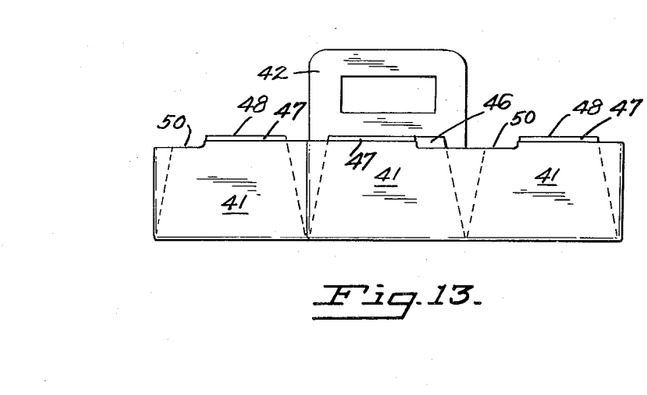
Fig. 13 is an upright side elevational view of the carrier collar in collapsed state.
Figure 14:
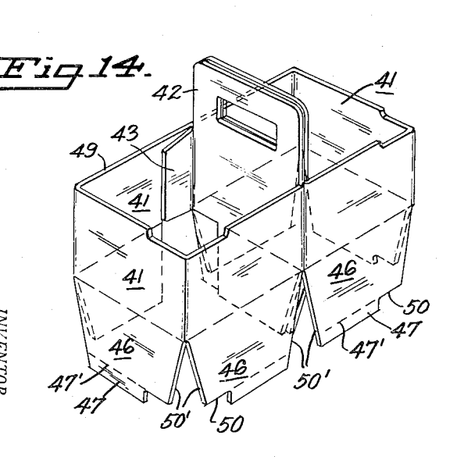
Fig. 14 is an isometric view of such collar in set up position.
Figure 15:
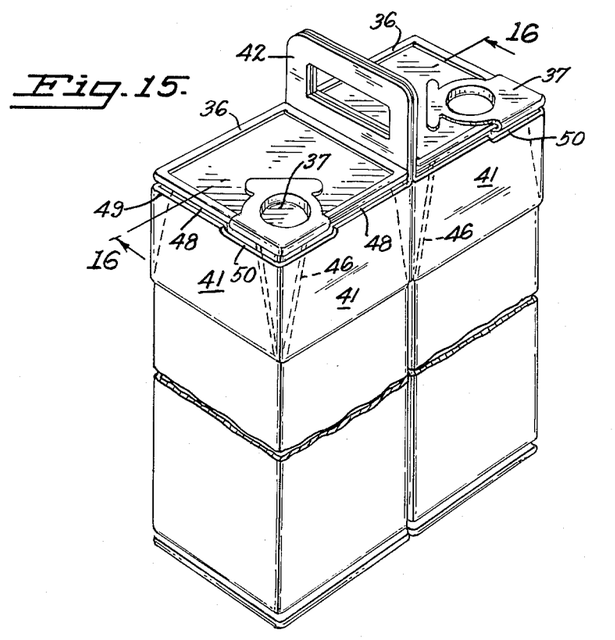
Fig. 15 is an isometric view of the carrier collar formed from the blank of Fig. 12 embracing a pair of milk cartons of the modified type; portions of the milk cartons being broken away to shorten the view.
Figure 16:
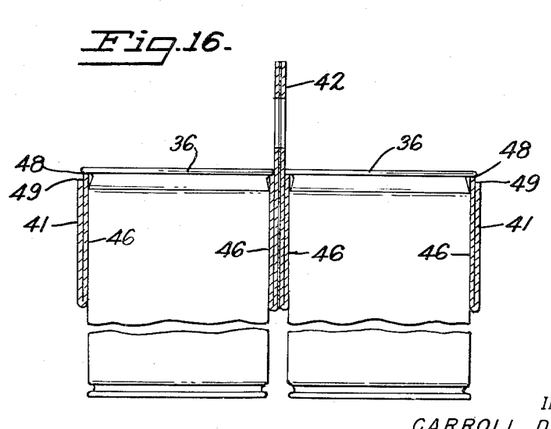
Fig. 16 is a vertical section taken in a plane indicated by line 16—16 in Fig. 15.

Extending from each of panels 41 and hingedly connected thereto along scored crease line 44 is an abutment flap 46; each of which has a hinged tip portion 47 joined to the flap by a cut-score line 47'. These abutment flaps are adapted to be swung inwardly on their hinge connections, to a position between the inside face of the strip and the sides of the cartons as shown in Figs. 13 and 16. When thus positioned, upper edges 48 of tips 47 serve as the abutments engaging the undersides of rim portion 36 of each carton to support the same; the hinge connections 47' enabling the tips 47 to yield inwardly and thus insure positive engagement of edges 48 with rim portion 36. Abutment flaps 46 are of such length that their abutment edges 48 extend slightly above the upper end 49 of the collar, so that the filled cartons find good support on the flaps, tending to move their hinged tips 47 inwardly by their weight, and thus preclude slipping of the cartons through the collar cells. Preferably, a pair of adjacent flaps 46 of each cell, is provided with corner cut-outs 50 and the associated upper edges of the adjacent panels 41 are similarly cut-out to accommodate the lid of pouring spout 37.

In inserting the cartons into the cells, the abutment flaps may be pushed inwardly and the cartons slipped into the cells from below; or the carrier cells can be slipped over the tops of the cartons. Preferably the lateral ends of adjacent abutment flaps 46 are cut-away at 50' to facilitate inward folding of the flaps without end interference. When rim portions 36 of the cartons are moved relative to the upper abutment edges 48 of the inwardly folded abutment flaps, such abutment edges will snap into position under rim portions 36 to support the cartons firmly. Each carton may be removed readily by pulling it upwardly from a carrier cell. With the type of carton under discussion having a relatively flat top, the handle flap 21 of the previously described modification might prove an impediment when the carton is removed. Hence, it is preferably omitted from the modification of Figs. 12 through 16.

In Figs. 17 through 20 is disclosed another modification which is also adapted for the projecting rim type of carton described with reference to the modification of Figs. 12 through 16, but which is, however, not as satisfactory as the modification of Figs. 12 through 16 because of the possibility of slippage. In the modification of Figs. 17 through 20, the scoring and paneling arrangement of blank 51 is essentially the same as in the blank of Fig. 1 previously described. Such blank is formed with a long panel 52 and shorter panels 53, the extreme end panels 53 of which have the handle extensions 54 to one of which is hingedly connected securing flap 56, which is adapted to be adhesively secured to inside face of long panel 52. Thus, the secured strip can be extended from a collapsed position shown in Fig. 18 to the set up position shown in Fig. 19.

Figures 17, 18, 19, 20:
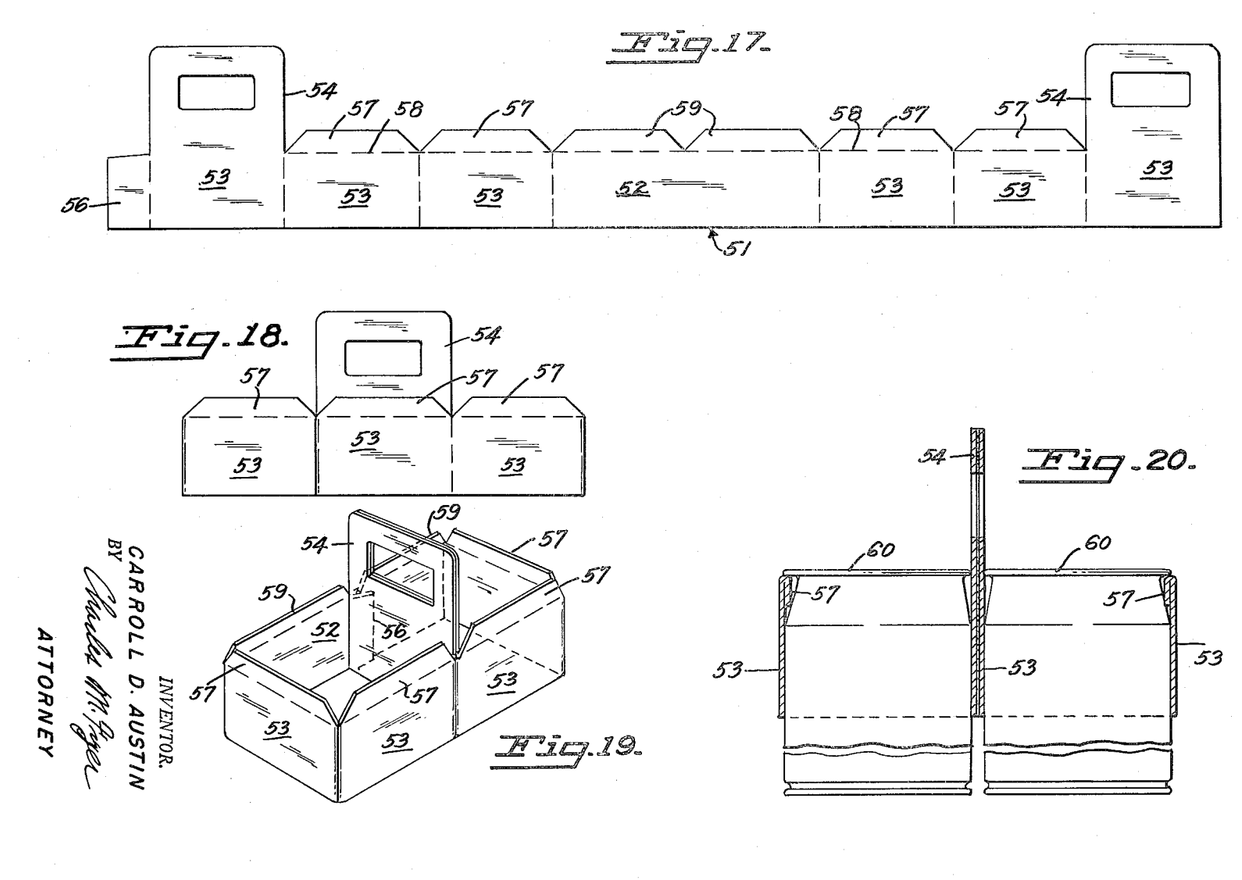
Fig. 17 is an inside face plan view of a further modified blank adapted for the same type of milk carton as the construction of Figs. 12 through 15.
Fig. 18 is an upright side elevational view of such carrier collar in collapsed state.
Fig. 19 is an isometric view of the carrier collar in set up position.
Fig. 20 is a vertical sectional view illustrating the carrier collar embracing a pair of milk cartons.

Connected to the upper edge of each of short panels 53, except the extreme end panels, is a flap 57 adapted to be bent inwardly along the crease line 58; and a pair of such flaps 59 is similarly hingedly connected to the upper edge of long panel 52. Thus, a flap is provided along three sides of the carton when it is introduced into a carrier cell. In inserting a carton into a carrier cell, flaps 57 and 59 are bent inwardly, so as to be positioned between the sides of the carton and the inside of the collar; the carton being inserted from the top of each cell. The flaps have a tendency to spring inwardly to frictionally engage the carton. Also, the carton rim 60 finds support on the hinge lines of the flaps, as is indicated in Fig. 20.

With respect to the blanks of all of the previously described modifications, it will be noted that the extreme end panels of each blank, having the handle extensions, are so folded in forming the carrier as to cause their outside faces to face inwardly. For purposes of economy, it is generally desirable to apply an ornamental coating on only one face of the paperboard. Hence, with the panel arrangement of the previous modifications, such coating will not face outwardly on the handle panels.

Figure 21:
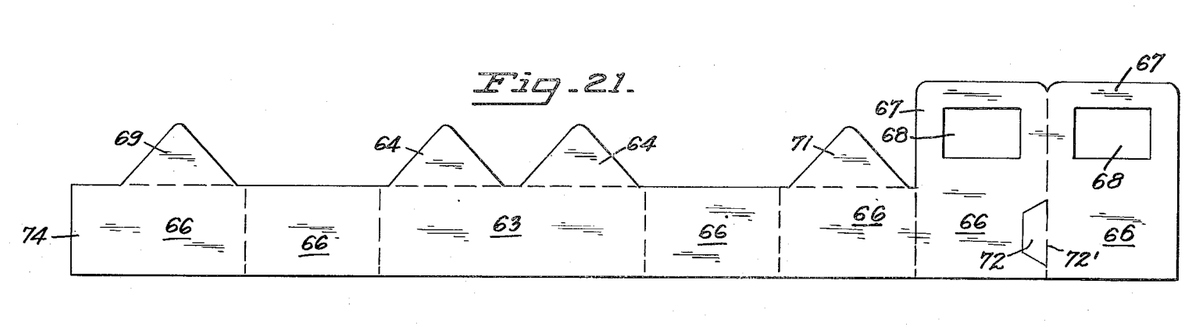
Fig. 21 is an inside face plan view of a form of blank having a modified panel arrangement but which produces the same type of set up collar cell and handle arrangement as in the other forms of carrier blanks.
Figure 22:
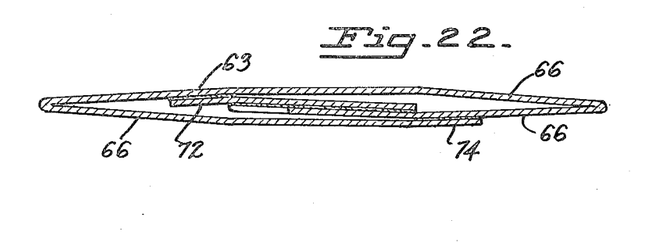
Fig. 22 is a horizontal section of such blank in collapsed carrier collar form.
Figure 23:
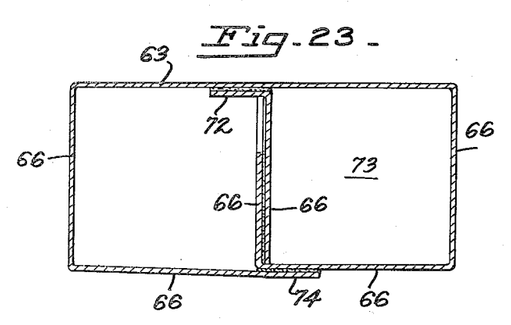
Fig. 23 is a similar horizontal section but with the carrier collar in set up position.
Figure 24:
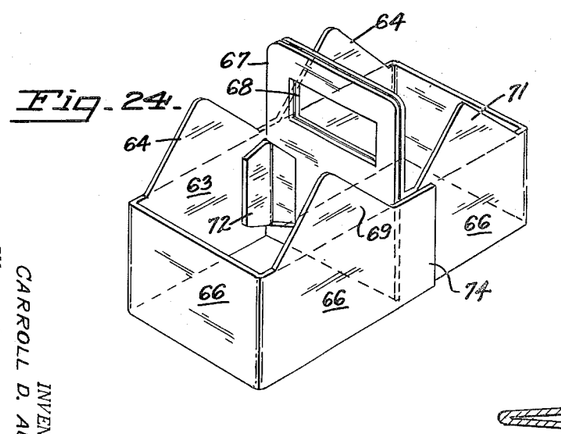
Fig. 24 is an isometric view of the set up carrier collar.

The blank of Fig. 21 provides the same functional arrangement as the previously described blanks in the set up collar, but the arrangement of the handle panels is such that the outside faces of the handle panels will be exposed when the blank is folded into carrier collar form, thus enabling the coating on paperboard coated on only one face to be exposed on the handle panels. As with respect to the previously described modification of Fig. 1, the blank strip is formed with a long panel portion 63 having abutment flaps 64 hingedly connected to the upper edge, and with shorter panel portions 66; the two end panel portions 66 having the handle extensions 67 adapted to extend across the collar between adjacent cartons. Such handle extensions 67 are provided with hand holes 68.

An abutment flap 69 is provided on the upper edge of the extreme left end panel 66 and a similar abutment flap 71 is provided on the upper edge of the panel 66 next to the first right hand handle extension 67. When the panels of the strip are folded inwardly into collar form, abutment flaps 69 and 71 are opposite the respective abutment flaps 64, and serve the function previously related.

In folding the strip into collar form, the extreme right hand panel 66 having handle extension 67 is folded inwardly to face the adjacent panel; the adjacent faces of such panels being adhesively secured together. The panels are then turned inwardly so that the junction between the two right hand panels 66 having the handle extension 67, is midway between the long panel 63. A securing flap 72 cut out from the next to the last right hand panel 66 is provided, and is connected along the crease line 72' between such two right hand panels 66 so that it may be adhesively secured to the inside face of panel 63 to hold the right hand cell 73 in position.

An extension 74 is hingedly connected to the extreme left panel 66; and when the left cell is formed by turning the two left panels 66 inwardly, the entire collar is held in position by adhesive securing of extension 74 to the outside face of the right hand short panel 66 next to the handle panels.

It will be apparent that the described panel arrangement with the handle providing panels adjacent each other at one end of the strip can be adopted for the other modifications disclosed in the application.

I claim:

1. A carrier for a plurality of cartons or the like comprising a collar having hingedly connected panels for embracing adjacent cartons positioned in side by side relationship, a handle on said collar, and abutment means on said collar engageable with abutment portions on said cartons for supporting the cartons.

2. A carrier for a pair of cartons or the like comprising a collar having hingedly connected panels for embracing said pair of cartons positioned in side by side relationship, a plurality of such panels projecting above the upper end of said collar to provide a handle, and abutment means on said collar engageable with abutment portions on said cartons for supporting the cartons.

3. A carrier for a pair of cartons or the like comprising a collar formed of a single strip of material scored to provide hingedly connected panels for embracing said pair of cartons positioned in side by side relationship, a plurality of such panels projecting above the upper end of said collar to provide a handle, and flaps on said collar providing abutments for engaging abutment portions on said cartons to support said cartons.

4. A carrier for a plurality of cartons or the like comprising a collar formed of a single strip of material scored to provide hingedly connected panels for embracing adjacent cartons positioned in side by side relationship, a plurality of such panels being positioned to extend between adjacent cartons and projecting above the upper end of said collar to provide a handle, and flaps hingedly connected to said collar providing abutments for engaging abutment portions on the cartons to support the cartons.

5. A carrier for a plurality of cartons or the like of the type having concavities in opposite sides, comprising a collar formed of paperboard scored to provide hingedly connected panels for embracing adjacent cartons positioned in side by side relationship, a plurality of such panels projecting above the upper end of said collar to provide a handle, and upwardly extending flaps hingedly connected to the upper end of said collar, each of said flaps being adapted to be pushed inwardly into one of said concavities to provide an abutment support.

6. A carrier for a plurality of cartons or the like of the type having projecting rim portions, comprising a collar formed of paperboard scored to provide hingedly connected panels for embracing adjacent cartons positioned in side by side relationship, a plurality of such panels projecting above the upper end of said collar to provide a handle, and flaps hingedly connected to said collar so as to be movable to a position between said collar and the bodies of said cartons and having edges providing abutments for engaging said carton rim portions to support the cartons.

7. A carrier for a plurality of cartons or the like comprising a collar formed of a single strip of paperboard scored to provide hingedly connected panels for embracing adjacent cartons positioned in side by side relationship, portions of said strip being secured together with a pair of said panels in face to face relationship, said securing of the strip enabling the collar to be set-up from a collapsed position with a carton receiving cell at each side of said pair of panels, said pair of panels projecting above the upper end of said collar.

8. A carrier for a pair of cartons or the like comprising a collar formed of a single strip of paperboard scored to provide hingedly connected panels for embracing said pair of cartons positioned in side by side relationship, portions of said strip being adhesively secured together with a pair of said panels in face to face relationship, said securing of the strip enabling the collar to be set-up from a collapsed position with a carton receiving cell at each side of said pair of panels, said pair of panels being adhesively secured together and projecting above the upper end of said collar to provide a handle portion, and flaps hingedly connected to said collar having edges providing abutments for engaging abutment portions on the cartons to support the cartons.

9. A carrier for cartons or the like comprising a collar open at the top and the bottom to provide a cell for receiving and embracing a carton, and a flap hingedly connected to said collar providing an abutment for engaging an abutment portion on the carton to support the carton.

10. A carrier blank for a plurality of cartons or the like comprising a single strip of paperboard scored to provide a plurality of hingedly connected panels, a plurality of said panels having portions extending above an edge of the strip to provide a handle, and flaps hingedly connected to said strip by score lines and providing abutments for engaging and supporting said cartons.

11. A carrier for cartons or the like comprising a collar portion open at the top and at the bottom and having hingedly connected panels for embracing adjacent cartons extending through the collar in side by side relationship, and a handle portion, one of said portions having flaps connected thereto and providing abutments for engaging abutment portions on said cartons to support said cartons.

12. A carrier for cartons or the like comprising a collar portion open at the top and at the bottom and having hingedly connected panels for embracing adjacent cartons extending through the collar in side by side relationship, and a handle portion, one of said portions having flaps, each of said flaps being hingedly connected by a score line which enables such flap to be positioned between a face of said one portion and the body of a carton to provide an upper abutment edge for engaging a rim portion on such carton to support the carton.

13. A carrier for cartons or the like comprising a collar portion open at the top and at the bottom and having hingedly connected panels for embracing adjacent cartons extending through the collar in side by side relationship, and a handle portion projecting above the upper end of said collar portion and extending transversely across said collar portion at a location between opposite sides thereof in a plane between adjacent sides of said cartons, one of said portions having flaps hingedly connected thereto and providing abutments for engaging abutment portions on said cartons to support said cartons.

14. The construction of claim 13 in which each flap extends upwardly from the upper end of said collar portion and is of a triangular shape to be pushed inwardly into a concavity in a carton.

References Cited in the file of this patent
UNITED STATES PATENTS

| | | |
|---|---|---|
| 2,273,266 | Himes | Feb. 17, 1942 |
| 2,514,858 | Gray | July 11, 1950 |
| 2,522,950 | Keith | Sept. 19, 1950 |
| 2,680,039 | Burge | June 1, 1954 |